United States Patent
He

(10) Patent No.: US 10,225,562 B1
(45) Date of Patent: Mar. 5, 2019

(54) EMBEDDING INFORMATION ABOUT EOB POSITIONS

(71) Applicant: GOOGLE LLC, Mountain View, CA (US)

(72) Inventor: Dake He, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 33 days.

(21) Appl. No.: 15/681,493

(22) Filed: Aug. 21, 2017

(51) Int. Cl.
*H04N 7/12* (2006.01)
*H04N 11/02* (2006.01)
*H04N 11/04* (2006.01)
*H04N 19/18* (2014.01)
*H04N 19/129* (2014.01)
*H04N 19/467* (2014.01)
*H04N 19/61* (2014.01)
*H04N 19/48* (2014.01)
(Continued)

(52) U.S. Cl.
CPC ........... *H04N 19/18* (2014.11); *H04N 19/129* (2014.11); *H04N 19/467* (2014.11); *H04N 19/61* (2014.11); *H04N 19/48* (2014.11); *H04N 19/513* (2014.11); *H04N 19/547* (2014.11)

(58) Field of Classification Search
USPC ................................................ 375/240.12
See application file for complete search history.

(56) References Cited

U.S. PATENT DOCUMENTS

2002/0146177 A1* 10/2002 Li ..................... H04N 19/647
382/251
2013/0027230 A1* 1/2013 Marpe ................. H03M 7/4006
341/107
(Continued)

FOREIGN PATENT DOCUMENTS

EP           3182705 A2    6/2017
WO      2013/046808 A1    4/2013

OTHER PUBLICATIONS

Zhang et al. "Additional Sign Bit Hiding of Transform Coefficients in HEVC"; The Hong Kong University of Science and Technology; 2013; pp. 1-4.
(Continued)

*Primary Examiner* — Chikaodili E Anyikire
(74) *Attorney, Agent, or Firm* — Young Basile Hanlon & MacFarlane, P.C.

(57) ABSTRACT

A method for decoding a transform block of quantized transform coefficients includes decoding a predetermined number of coefficients of the quantized transform coefficients, determining a value for the predetermined number of coefficients, and decoding a subsequent quantized transform coefficient by reading bits from the encoded bitstream and traversing a coefficient token tree having a root node indicating an EOB token. The decoding of the subsequent quantized transform coefficient uses the value to determine whether to traverse the coefficient token tree starting at the root node or at another node. A method for encoding a transform block of quantized transform coefficients includes partitioning the quantized transform coefficients into at least a first coefficients group and a second coefficients group, determining a value of the first coefficients group, and encoding, based on the value, a bit indicative of an end-of-
(Continued)

block (EOB) for a transform coefficient of the second coefficients group.

7 Claims, 12 Drawing Sheets

(51) Int. Cl.
 *H04N 19/513* (2014.01)
 *H04N 19/547* (2014.01)

(56) References Cited

U.S. PATENT DOCUMENTS

| | | | |
|---|---|---|---|
| 2013/0272424 A1 | 10/2013 | Sole Rojals et al. | |
| 2014/0210652 A1* | 7/2014 | Bartnik | H03M 7/40 341/67 |

OTHER PUBLICATIONS

Wang et al; "Multiple Sign Bits Hiding for High Efficiency Video Coding"; Visual Communications and Image Processing (VCIP), 2012 IEEE; pp. 1-3.
Sole et al; "Transform Coefficient Coding in HEVC"; IEE Transactions on Circuits and Systems for Video Technology, vol. 22, No. 12, Dec. 2012; pp. 1765-1777.
Bankoski, et al., "Technical Overview of VP8, An Open Source Video Codec for the Web", Jul. 11, 2011, 6 pp.
Bankoski et al, "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.
International Search Report and Written Opinion in PCT/US2018/031571, dated Aug. 14, 2018, 12 pgs.
Gordon Clare et al., "Non-CEII: Sign Data Hiding without RDOQ", Joint Collaborative Team on Video Coding (JCT-VC) of ITU-T SG16 WP3 and ISO/IEC JTC1/SC29/WG11, 8th Meeting, San Jose, CA, USA, Feb. 1-10, 2012, Doc. JCTVC-H0227 (Feb. 2, 2012), pp. 1-10.
Detlev Marpe et al., "Context-based adaptive binary arithmetic coding in the H.264/AVC video compression standard", IEEE Transactions on Circuits and Systems for Video Technology, vol. 13, No. 7, Jul. 2003, pp. 620-636.

* cited by examiner

EMBEDDING INFORMATION ABOUT EOB POSITIONS

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other encoding techniques.

Encoding based on motion estimation and compensation may be performed by breaking frames or images into blocks that are predicted based on one or more prediction blocks of reference frames. Differences (i.e., residual errors) between blocks and prediction blocks are compressed and encoded in a bitstream. A decoder uses the differences and the reference frames to reconstruct the frames or images.

SUMMARY

One aspect of the disclosed implementations is a method for decoding a transform block of quantized transform coefficients according to one implementation. The method includes decoding, from an encoded bitstream, a predetermined number of coefficients of the quantized transform coefficients, determining a value for the predetermined number of coefficients, and decoding, from the encoded bitstream, a subsequent quantized transform coefficient by reading bits from the encoded bitstream and traversing a coefficient token tree having a root node. The root node indicates an EOB token. The subsequent quantized transform coefficient follows the predetermined number of coefficients in a scan order. The decoding of the subsequent quantized transform coefficient uses the value to determine whether to traverse the coefficient token tree starting at the root node or starting at another node in the coefficient token tree.

Another aspect is an apparatus for decoding a transform block of quantized transform coefficients including a memory and a processor according to one implementation of this disclosure. The processor configured to execute instructions stored in the memory to decode, from an encoded bitstream, a predetermined number of coefficients of the quantized transform coefficients, determine a value for the predetermined number of coefficients, and decode, from the encoded bitstream and based on the value, a bit indicative of an EOB indicator for a subsequent quantized transform coefficient.

Another aspect is a method for encoding a transform block of quantized transform coefficients according to one implementation of this disclosure. The method includes partitioning the quantized transform coefficients into at least a first coefficients group and a second coefficients group, determining a value of the first coefficients group, and encoding, in an encoded bitstream and based on the value, a bit indicative of an end-of-block (EOB) for a transform coefficient of the second coefficients group.

These and other aspects of the present disclosure are disclosed in the following detailed description of the embodiments, the appended claims, and the accompanying figures.

BRIEF DESCRIPTION OF THE DRAWINGS

The description herein refers to the accompanying drawings wherein like reference numerals refer to like parts throughout the several views.

DETAILED DESCRIPTION

Figure 1:
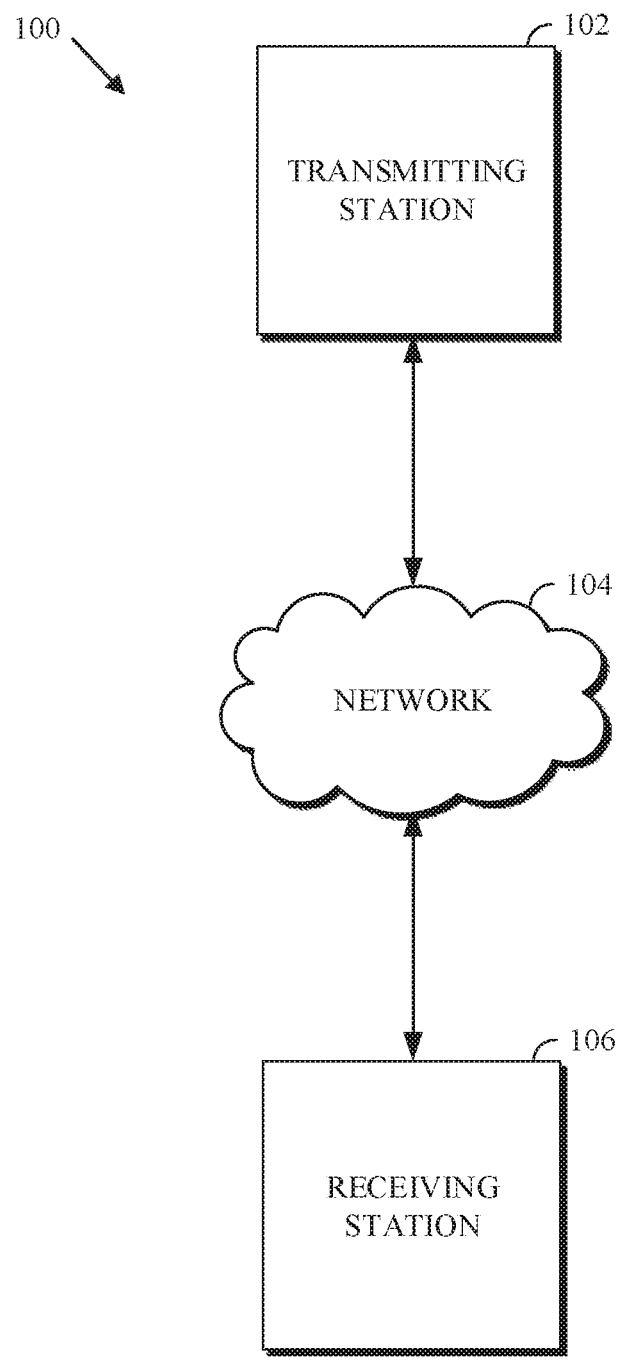
FIG. 1 is a schematic of a video encoding and decoding system.

As mentioned above, compression schemes related to coding video streams may include breaking images into blocks and generating a digital video output bitstream using one or more techniques to limit the information included in the output. A received encoded bitstream can be decoded to re-create the blocks and the source images from the limited information. Encoding a video stream, or a portion thereof, such as a frame or a block, can include using temporal or spatial similarities in the video stream to improve coding efficiency. For example, a current block of a video stream may be encoded based on identifying a difference (residual) between the previously coded pixel values and those in the current block. In this way, only the residual and parameters used to generate the residual need be added to the encoded bitstream. The residual may be encoded using a lossy quantization step.

As further described below, the residual block can be in the pixel domain. The residual block can be transformed into the frequency domain resulting in a transform block of transform coefficients. The transform coefficients can be quantized resulting into a quantized transform block of quantized transform coefficients. The quantized coefficients can be entropy encoded and added to an encoded bitstream. A decoder can receive the encoded bitstream, entropy decode the quantized transform coefficients to reconstruct the original video frame.

Entropy coding is a technique for "lossless" coding that relies upon probability models that model the distribution of values occurring in an encoded video bitstream. By using probability models based on a measured or estimated distribution of values, entropy coding can reduce the number of bits required to represent video data close to a theoretical minimum. In practice, the actual reduction in the number of bits required to represent video data can be a function of the accuracy of the probability model, the number of bits over which the coding is performed, and the computational accuracy of fixed-point arithmetic used to perform the coding.

In an encoded video bitstream, many of the bits are used for one of two things: either content prediction (e.g., inter mode/motion vector coding, intra prediction mode coding, etc.) or residual coding (e.g., transform coefficients). Encoders may use techniques to decrease the amount of bits spent on coefficient coding. A coefficient token tree (which may also be referred to as a binary token tree) specifies the scope of the value, with forward-adaptive probabilities for each branch in this token tree. The token base value is subtracted from the value to be coded to form a residual then the block is coded with fixed probabilities. A similar scheme with minor variations including backward-adaptivity is also possible. Adaptive techniques can alter the probability models as the video stream is being encoded to adapt to changing characteristics of the data. In any event, a decoder is informed of (or has available) the probability model used to encode an entropy-coded video bitstream in order to decode the video bitstream.

Implementations according to this disclosure partition the coefficients (e.g., quantized transform coefficients) in a transform block (e.g., quantized transform block) into two or more segments or groups of coefficients. The segments (i.e., the groups of coefficients) can be consecutive as described below. For example, the quantized transform coefficients can be partitioned into a first coefficients group and a second coefficients group. Checking the EOB_TOKEN at some positions in the second segment (i.e., for some of the transform coefficients of the second coefficients group) can be skipped based on the decoded coefficients in the first segment. For example, the checking can be skipped based on a value of the decoded coefficients in the first coefficients group. The value can be the absolute sum of the decoded coefficients in the first coefficients group.

In an example, if the sum of the transform coefficients in the first coefficients group (denoted uSum) is odd, the number of nonzero coefficients in the second segment can be assumed to be odd; and if uSum is even, then the number of nonzero coefficients in the second coefficients group can be assumed to be even. As such, the EOB_TOKEN need be checked only after every other nonzero coefficient in the second coefficients group. This technique is referred to herein as embedding EOB positions in coefficient (i.e., quantized transform coefficients) values.

As such, for an M×N transform block, and where the first coefficients group includes K−1 transform coefficients, the total number of times of coding whether a current token is equal to EOB_TOKEN is equal to (K+ceiling((M*N−K)/2))). This can result in a saving of decoding operations otherwise needed to decode as many as floor((M*N−K)/2) context-coded binary decisions. Note that a context-coded binary decision involves the following essential steps in computation: context derivation (e.g., deriving a context for coding and decoding), probability determination (e.g., computing or looking up a probability for coding and decoding given the context), and boolean encoding and decoding (e.g., binary arithmetic coding and decoding using the determined probability). For a fractional number, the function ceiling returns the smallest integer number that is larger than the fractional number, and the function floor returns the largest integer number that is smaller than the fractional number. For example, for a 4×4 transform block where the first coefficients group includes the first 5 (i.e., K=6) transform coefficients in a scan order and the second coefficients group includes 11 (i.e., M×N−K=4*4−6=10) transform coefficients, implementations according to this disclosure can result in coding the EOB_TOKEN 11 times (instead of M×N=4*4=16) resulting in a saving of 5 context-coded binary symbols. Encoding or decoding a transform coefficient (e.g., the encoding or decoding a binary string representing the transform coefficient) is computationally costly because binary arithmetic coding is used. Context-based binary arithmetic coding entails the determining of a context (and, thus, a probability model) for each bin of the codewords.

In implementations of this disclosure, compression performance may be improved by reducing the number of bits used to encode the quantized transform coefficients. For example, by skipping the encoding and decoding of bits indicative of the EOB token for some of the quantized transform coefficients, the number of bits required to encode the quantized transform coefficients can be reduced. Implementations according to this disclosure can determine whether to skip the encoding of the bits by embedding information about end-of-block (EOB) positions into other coefficient values. The benefits of implementations according to this disclosure include 1) an improved rate-distortion performance and 2) reduced decoding complexity due to the savings of context-based coding operations in coding the EOB positions.

Embedding information about EOB positions in video coding is described herein first with reference to a system in which the teachings may be incorporated.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
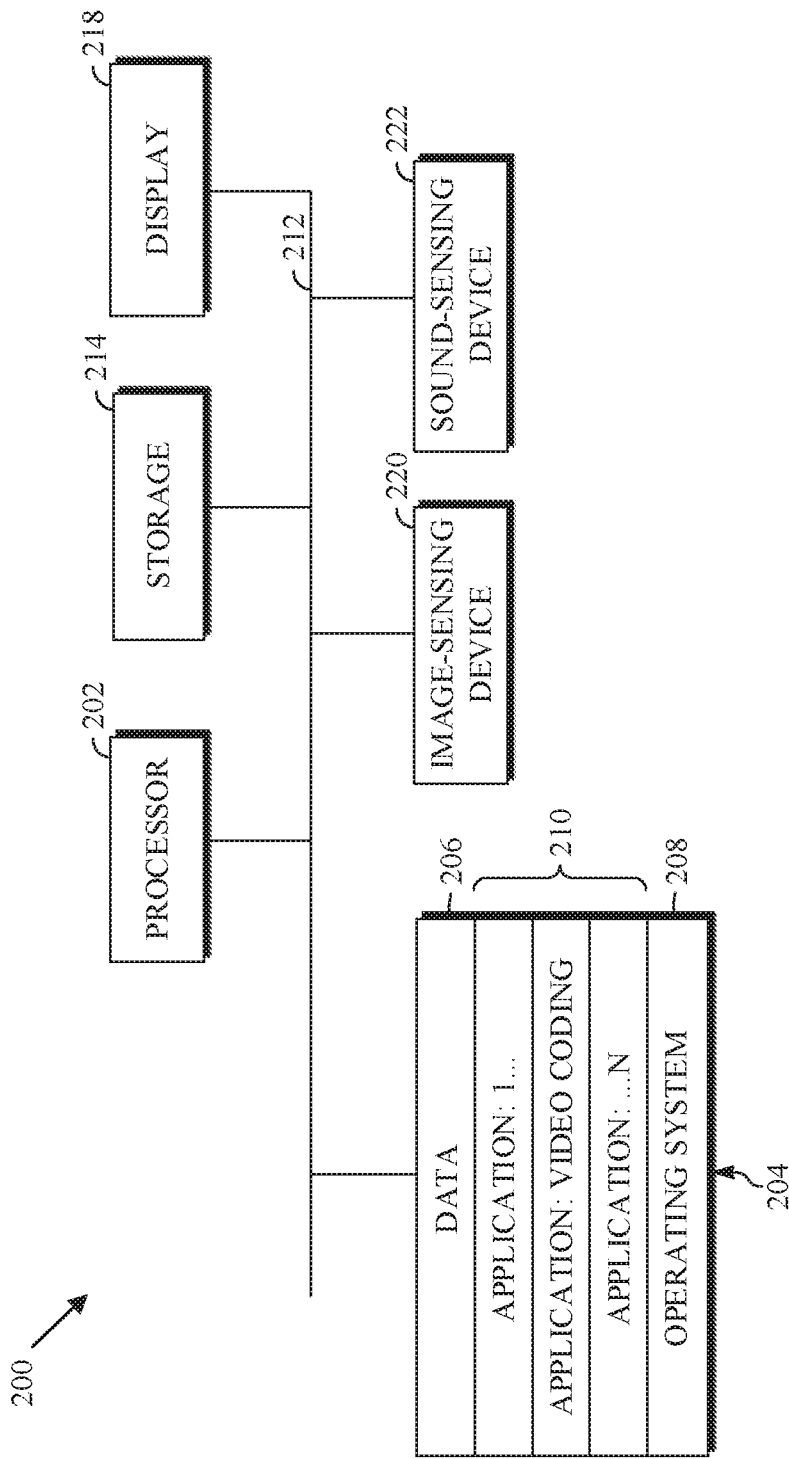
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission, at a later time, to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., an HTTP-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example, a camera or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more of processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
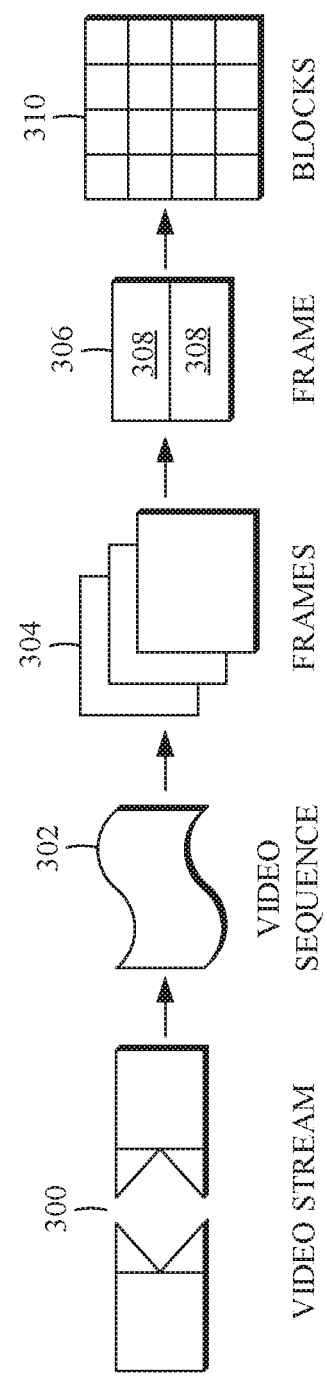
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels or larger.

Figure 4:
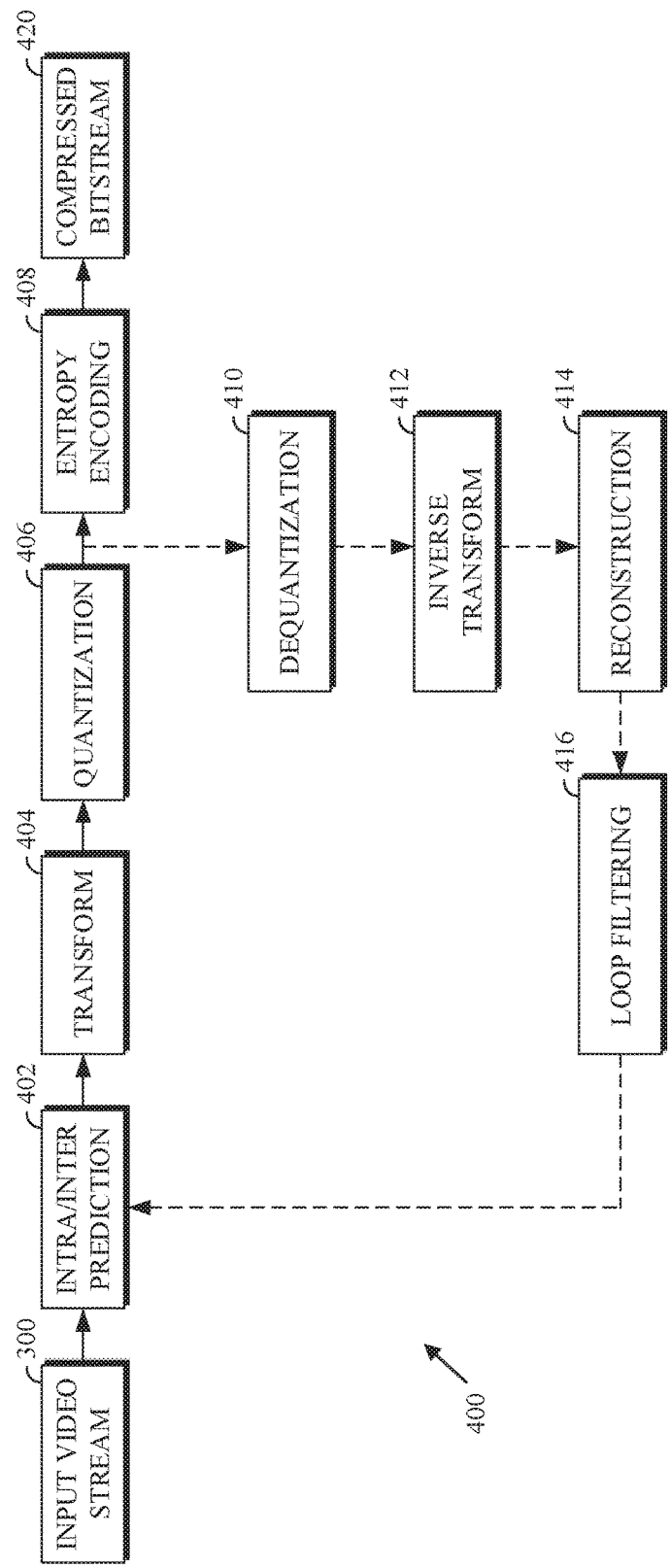
FIG. 4 is a block diagram of an encoder according to implementations of this disclosure.

FIG. 4 is a block diagram of an encoder 400 in accordance with implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination of both. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The information to decode the block may be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
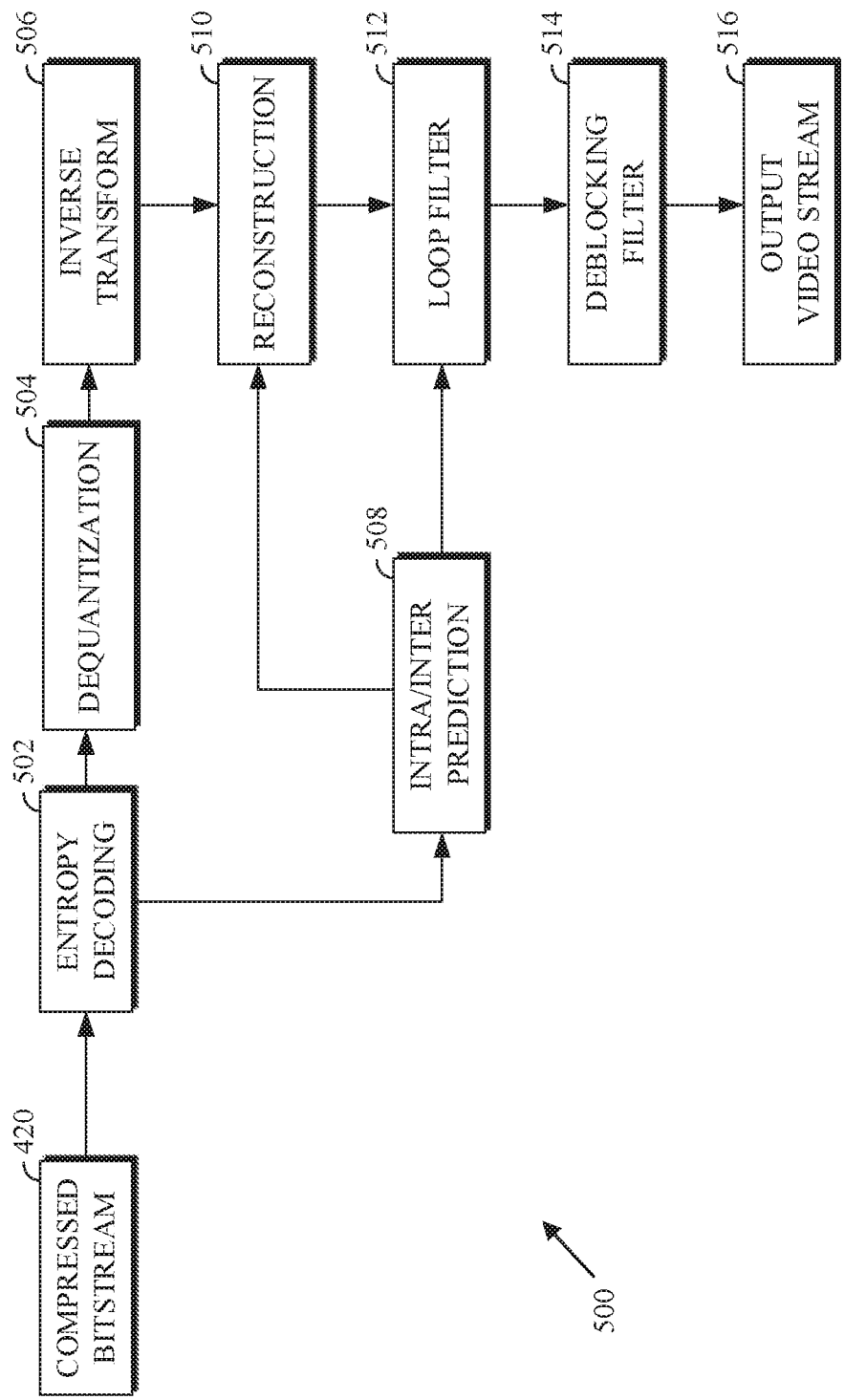
FIG. 5 is a block diagram of a decoder according to implementations of this disclosure.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIGS. 8 and 9 below. The decoder 500 can also be implemented in hardware included in, for example, the transmitting station 102 or the receiving station 106. The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In an example, the deblocking filtering stage 514 is applied to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the deblocking filtering stage 514. In some implementations of the decoder 500, the deblocking filtering stage 514 is applied before the loop filtering stage 512. Additionally, or alternatively, the encoder 400 includes a deblocking filtering stage in addition to the loop filtering stage 416.

Figure 6:
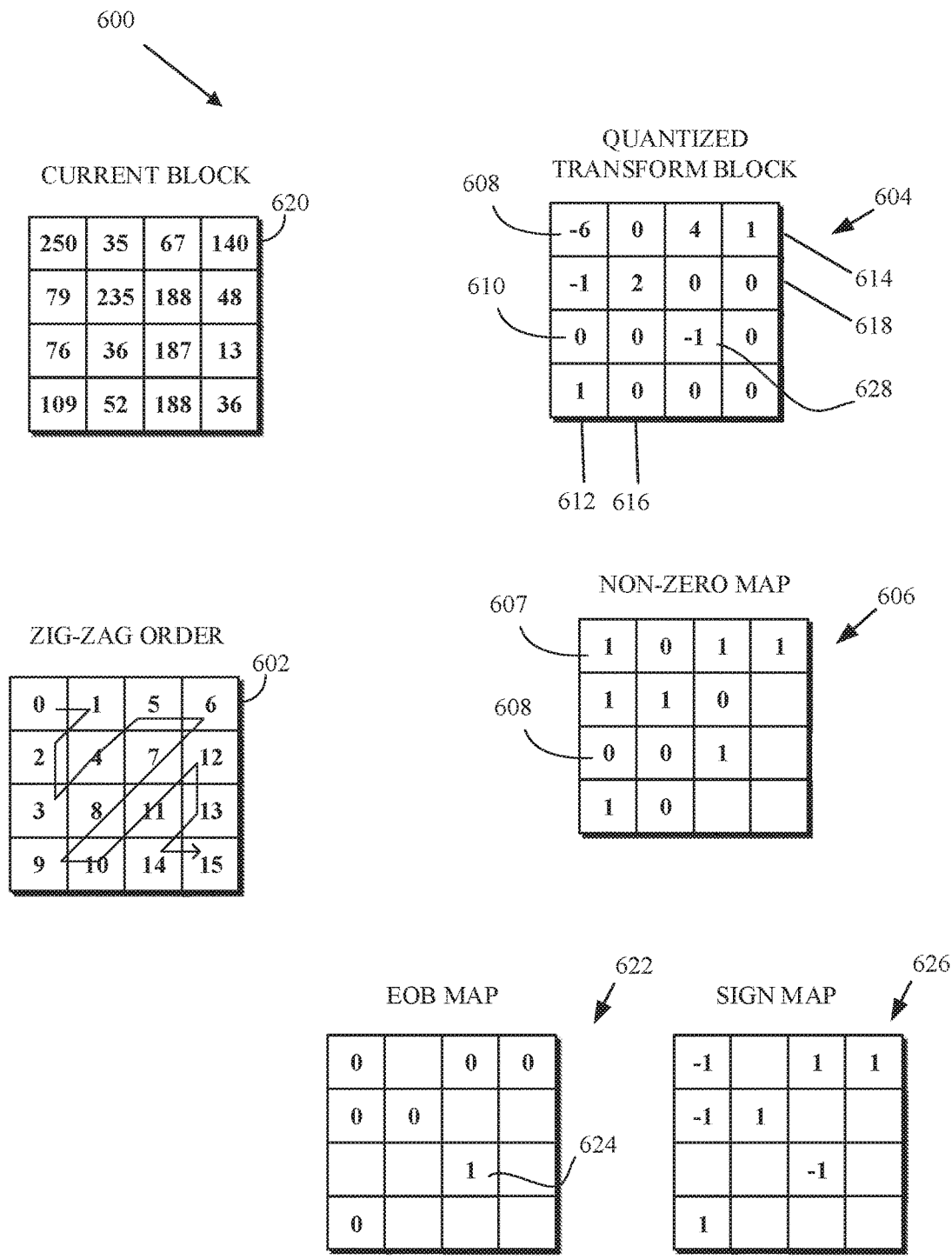
FIG. 6 is a diagram illustrating quantized transform coefficients according to implementations of this disclosure.

FIG. 6 is a diagram 600 illustrating quantized transform coefficients according to implementations of this disclosure. The diagram 600 depicts a current block 620, a scan order 602, a quantized transform block 604, a non-zero map 606, an end-of-block map 622, and a sign map 626. The current block 620 is illustrated as a 4×4 block. However, any block size is possible. For example, the current block can have a size (i.e., dimensions) of 4×4, 8×8, 16×16, 32×32, or any other square or rectangular block size. The current block 620 can be a block of a current frame. In another example, the current frame may be partitioned into segments (such as the segments 308 of FIG. 3), tiles, or the like, each including a collection of blocks, where the current block is a block of the partition.

The quantized transform block 604 can be a block of size similar to the size of the current block 620. The quantized transform block 604 includes non-zero coefficients (e.g., a coefficient 608) and zero coefficients (e.g., a coefficient 610). As described above, the quantized transform block 604 contains quantized transform coefficients for the residual block corresponding to the current block 620. Also as described above, the quantized transform coefficients are entropy coded by an entropy-coding phase, such as the entropy coding stage 408 of FIG. 4.

Entropy coding a quantized transform coefficient can involve the selection of a context model (also referred to as probability context model, probability model, model, and context) which provides estimates of conditional probabilities for coding the binary symbols of a binarized transform coefficient as described below with respect to FIG. 7. When entropy coding a quantized transform coefficient, additional information may be used as the context for selecting a context model. For example, the magnitudes of the previously coded transform coefficients can be used, at least partially, for determining a probability model.

To encode a transform block, a video coding system may traverse the transform block in a scan order and encode (e.g., entropy encode) the quantized transform coefficients as the quantized transform coefficients are respectively traversed (i.e., visited). In a zig-zag scan order, such as the scan order 602, the top left corner of the transform block (also known as the DC coefficient) is first traversed and encoded, the next coefficient in the scan order (i.e., the transform coefficient corresponding to the location labeled "1") is traversed and encoded, and so on. In the zig-zag scan order (i.e., scan order 602), some quantized transform coefficients above and to the left of a current quantized transform coefficient (e.g., a to-be-encoded transform coefficient) are traversed first. Other scan orders are possible. A one-dimensional structure (e.g., an array) of quantized transform coefficients can result from the traversal of the two-dimensional quantized transform block using the scan order.

In some examples, encoding the quantized transform block 604 can include determining the non-zero map 606, which indicates which quantized transform coefficients of the quantized transform block 604 are zero and which are non-zero. A non-zero coefficient and a zero coefficient can be indicated with values one (1) and zero (0), respectively, in the non-zero map. For example, the non-zero map 606 includes a non-zero 607 at Cartesian location (0, 0) corresponding to the coefficient 608 and a zero 608 at Cartesian location (2, 0) corresponding to the coefficient 610.

In some examples, encoding the quantized transform block 604 can include generating and encoding the end-of-block map 622. The end-of-block map indicates whether a non-zero quantized transform coefficient of the quantized transform block 604 is the last non-zero coefficient with respect to a given scan order. If a non-zero coefficient is not the last non-zero coefficient in the transform block, then it can be indicated with the binary bit 0 (zero) in the end-of-block map. If, on the other hand, a non-zero coefficient is the last non-zero coefficient in the transform block, then it can be indicated with the binary value 1 (one) in the end-of-block map. For example, as the quantized transform coefficient corresponding to the scan location 11 (i.e., the last non-zero quantized transform coefficient 628) is the last non-zero coefficient of the quantized transform block 604, it is indicated with the end-of-block value 624 of 1 (one); all other non-zero transform coefficients are indicated with a zero.

In some examples, encoding the quantized transform block 604 can include generating and encoding the sign map 626. The sign map 626 indicates which non-zero quantized transform coefficients of the quantized transform block 604 have positive values and which quantized transform coefficients have negative values. Transform coefficients that are zero need not be indicated in the sign map. The sign map 626 illustrates the sign map for the quantized transform block 604. In the sign map, negative quantized transform coefficients can be indicated with a −1 and positive quantized transform coefficients can be indicated with a 1.

Figure 7:
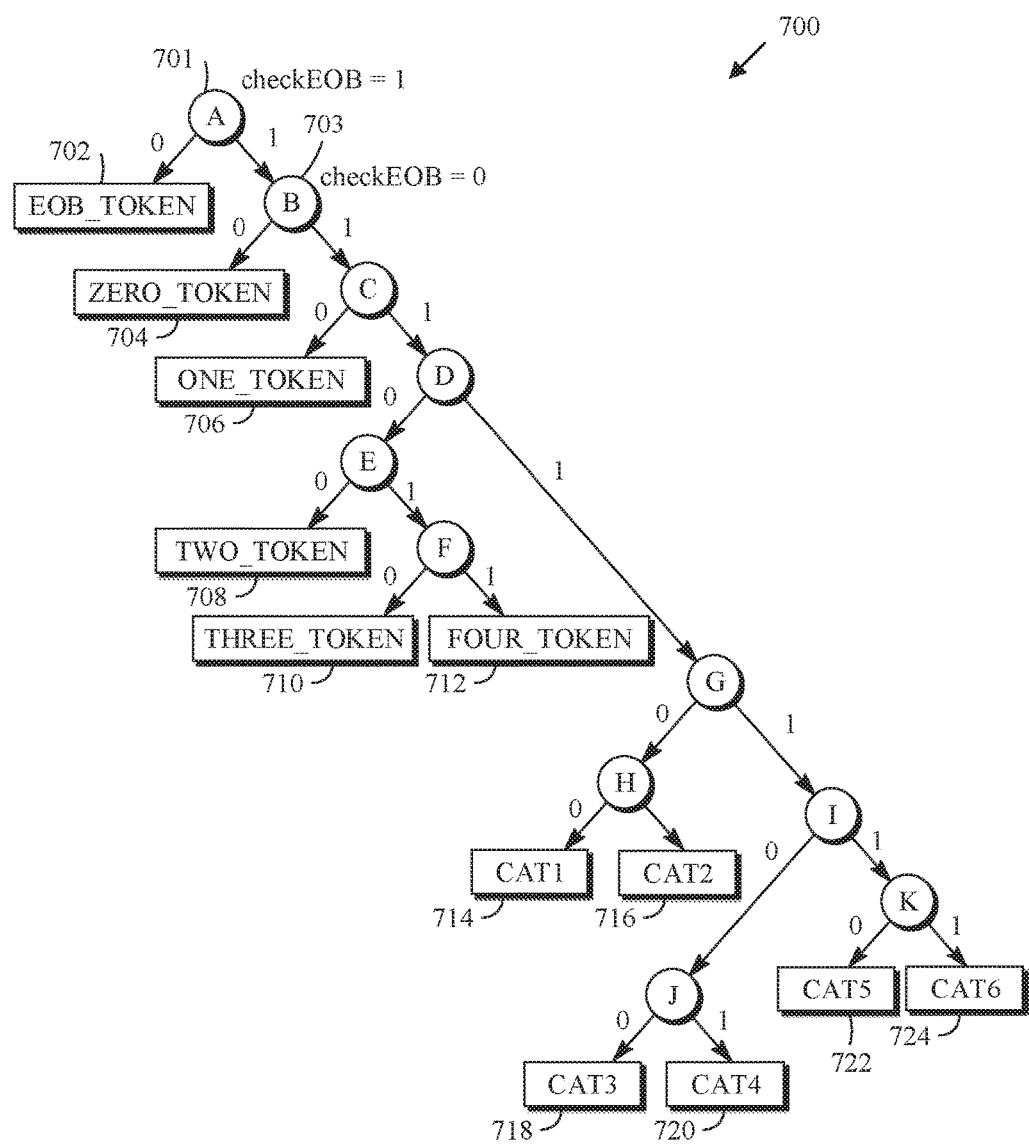
FIG. 7 is a diagram of a coefficient token tree that can be used to entropy code blocks into a video bitstream according to implementations of this disclosure.

FIG. 7 is a diagram of a coefficient token tree 700 that can be used to entropy code blocks into a video bitstream according to implementations of this disclosure. The coefficient token tree 700 is referred to as a binary tree because, at each node of the tree, one of two branches must be taken (i.e., traversed). The coefficient token tree 700 includes a root node 701 and a node 703 corresponding, respectively, to the nodes labeled A and B.

As described above with respect to FIG. 6, when an end-of-block (EOB) token is detected for a block, coding of coefficients in the current block can terminate and the remaining coefficients in the block can be inferred to be zero. As such, the coding of EOB positions can be an essential part of coefficient in a video coding system.

In some video coding systems, a binary decision determining whether (or not) a current token is equal to the EOB token of the current block is coded immediately after an nonzero coefficient is decoded or at the first scan position (DC). In an example, for a transform block of size M×N, where M denotes the number of columns and N denotes the number of rows in the transform block, the maximum number of times of coding whether a current token is equal to the EOB token is equal to M×N. M and N can take values, such as the values 2, 4, 8, 16, 32, and 64. As described below, the binary decision corresponds to the coding of a "1" bit corresponding to the decision to move from the root node 701 to the node 703 in the coefficient token tree 700. Herein, "coding a bit" can mean the outputting or generating of a bit in the codeword representing a transform coefficient being encoded. Similarly, "decoding a bit" can mean the reading (such as from an encoded bitstream) of a bit of the codeword corresponding to a quantized transform coefficient being decoded such that the bit corresponds to a branch being traversed in the coefficient token tree.

Using the coefficient token tree 700, a string of binary digits is generated for a quantized coefficient (e.g., the coefficients 608, 610 of FIG. 6) of the quantized transform block (such as the quantized transform block 604 of FIG. 6).

In an example, the quantized coefficients in an N×N block (e.g., quantized transform block 604) are organized into a 1D (one-dimensional) array (herein, an array u) following a prescribed scan order (e.g., the scan order 602 of FIG. 6). N can be 4, 8, 16, 32, or any other value. The quantized coefficient at the $i^{th}$ position of the 1D array can be referred as u[i], where i=0, . . . , N*N−1. The starting position of the last run of zeroes in u[i], . . . , u[N*N−1] can be denoted as eob. In the case where when u[N*N−1] is not zero, the eob can be set to the value N*N. That is, if the last coefficient of the 1D array u is not zero, then eob can be set to the value N*N. Using the examples of FIG. 6, the 1D array u can have the entries u[ ]=[−6, 0, −1, 0, 2, 4, 1, 0, 0, 1, 0, −1, 0, 0, 0, 0]. The values at each of the u[i]s is a quantized transform coefficient. The quantized transform coefficients of the 1D array u may also be referred herein simply as "coefficients" or "transform coefficients." The coefficient at location i=0 (i.e., u[0]=−6) corresponds to the DC coefficient. In this example, the eob is equal to 12 because there are no non-zero coefficients after the zero coefficient at position 12 of the 1D array u.

To encode and decode the coefficients u[i], . . . , u[N*N−1], for i=0 to N*N−1, a token t[i] is generated at each position i<=eob. The token t[i], for i<eob, can be indicative of the size and/or size range of the corresponding quantized transform coefficient at u[i]. The token for the quantized transform coefficient at eob can be an EOB_TOKEN, which is a token that indicates that the 1D array u contains no non-zero coefficients following the eob position (inclusive). That is, t[eob]=EOB_TOKEN indicates the EOB position of the current block. Table I provides a listing of an example of token values, excluding the EOB_TOKEN, and their corresponding names according to an implementation of this disclosure.

TABLE I

| Token | Name of Token |
| --- | --- |
| 0 | ZERO_TOKEN |
| 1 | ONE_TOKEN |
| 2 | TWO_TOKEN |
| 3 | THREE_TOKEN |
| 4 | FOUR_TOKEN |
| 5 | DCT_VAL_CAT1 (5, 6) |
| 6 | DCT_VAL_CAT2 (7-10) |
| 7 | DCT_VAL_CAT3 (11-18) |

TABLE I-continued

| Token | Name of Token |
| --- | --- |
| 8 | DCT_VAL_CAT4 (19-34) |
| 9 | DCT_VAL_CAT5 (35-66) |
| 10 | DCT_VAL_CAT6 (67-2048) |

In an example, quantized coefficient values are taken to be signed 12-bit integers. To represent a quantized coefficient value, the range of 12-bit signed values can be divided into 11 tokens (the tokens 0-10 in Table I) plus the end of block token (EOB_TOKEN). To generate a token to represent a quantized coefficient value, the coefficient token tree 700 can be traversed. The result (i.e., the bit string) of traversing the tree can then be encoded into a bitstream (such as the bitstream 420 of FIG. 4) by an encoder as described with respect to the entropy encoding stage 408 of FIG. 4.

The coefficient token tree 700 includes the tokens EOB_TOKEN (token 702), ZERO_TOKEN (token 704), ONE_TOKEN (token 706), TWO_TOKEN (token 708), THREE_TOKEN (token 710), FOUR_TOKEN (token 712), CAT1 (token 714 that is DCT_VAL_CAT1 in Table I), CAT2 (token 716 that is DCT_VAL_CAT2 in Table I), CAT3 (token 718 that is DCT_VAL_CAT3 in Table I), CAT4 (token 720 that is DCT_VAL_CAT4 in Table I), CAT5 (token 722 that is DCT_VAL_CAT5 in Table I) and CAT6 (token 724 that is DCT_VAL_CAT6 in Table I). As can be seen, the coefficient token tree maps a single quantized coefficient value into a single token, such as one of the tokens 704, 706, 708, 710 and 712. Other tokens, such as the tokens 714, 716, 718, 720, 722 and 724, represent ranges of quantized coefficient values. For example, a quantized transform coefficient with a value of 37 can be represented by the token DCT_VAL_CAT5—the token 722 in FIG. 7.

The base value for a token is defined as the smallest number in its range. For example, the base value for the token 720 is 19. Entropy coding identifies a token for each quantized coefficient and, if the token represents a range, can form a residual by subtracting the base value from the quantized coefficient. For example, a quantized transform coefficient with a value of 20 can be represented by including the token 720 and a residual value of 1 (i.e., 20 minus 19) in the encoded video bitstream to permit a decoder to reconstruct the original quantized transform coefficient. The end of block token (i.e., the token 702) signals that no further non-zero quantized coefficients remain in the transformed block data.

To encode or decode a token t[i] by using a binary arithmetic coding engine (such as by the entropy encoding stage 408 of FIG. 4), the coefficient token tree 700 can be used. The coefficient token tree 700 is traversed starting at the root node 701 (i.e., the node labeled A). Traversing the coefficient token tree generates a bit string (a codeword) that will be encoded into the bitstream using, for example, binary arithmetic coding. The bit string is a representation of the current coefficient (i.e., the quantized transform coefficient being encoded).

If a current coefficient is zero, and there are no more non-zero values for the remaining transform coefficients, the token 702 (i.e., the EOB_TOKEN) is added into the bitstream. This is the case, for example, for the transform coefficient at scan order location 12 of FIG. 6. On the other hand, if the current coefficient is non-zero, or if there are non-zero values among any remaining coefficients of the current block, a "1" bit is added to the codeword and traversal passes to the node 703 (i.e., the node labeled B). At node B, the current coefficient is tested to see if it is equal to zero. If so, the left-hand branch is taken such that token 704 representing the value ZERO_TOKEN and a bit "0" is added to the codeword. If not, a bit "1" is added to the codeword and traversal passes to node C. At node C, the current coefficient is tested to see if it is greater than 1. If the current coefficient is equal to 1, the left-hand branch is taken and token 706 representing the value ONE_TOKEN is added to the bitstream (i.e., a "0" bit is added to the codeword). If the current coefficient is greater than 1, traversal passes to node D to check the value of the current coefficient as compared to the value 4. If the current coefficient is less than or equal to 4, traversal passes to node E and a "0" bit is added to the codeword. At node E, a test for equality to the value "2" may be made. If true, token 706 representing the value "2" is added to the bitstream (i.e., a bit "0" is added to the codeword). Otherwise, at node F, the current coefficient is tested against either the value "3" or the value "4" and either token 710 (i.e., bit "0" is added to the codeword) or token 712 (i.e., bit "1" is added to the codeword) to the bitstream as appropriate; and so on.

Essentially, a "0" bit is added to the codeword upon traversal to a left child node and a "1" bit is added to the codeword upon traversal to a right child node. A similar process is undertaken by a decoder when decoding a codeword from a compressed bitstream. The decoder reads a bit from bit stream. If the bit is a "1," the coefficient token tree is traversed to the right and if the bit is a "0," the tree is traversed to the left. The decoder reads then a next bit and repeats the process until traversal of the tree reaches a leaf node (i.e., a token). As an example, to encode a token t[i]=THREE_TOKEN, starting from the root node (i.e., the root node 701), a binary string of 111010 is encoded. As another example, decoding the codeword 11100 results in the token TWO_TOKEN.

Note that the correspondence between "0" and "1" bits to left and right child nodes is merely a convention used to describe the encoding and decoding processes. In some implementations, a different convention, for example, in one where "1" corresponds to the left child node, and "0" corresponds to the right child node, can be used. As long as both the encoder and the decoder adopt the same convention, the processes described herein apply.

Since an EOB_TOKEN is only possible after a nonzero coefficient, when u[i−1] is zero (that is, when the quantized transform coefficient at location i−1 of the 1D array u is equal to zero), a decoder can infer that the first bit must be 1. The first bit has to be 1 since, in traversing the tree, for a transform coefficient (e.g., transform coefficient at the zigzag scan order location 2 of FIG. 6) following a zero transform coefficient (e.g., transform coefficient at the zigzag scan order location 1 of FIG. 6), the traversal necessarily moves from the root node 701 to the node 703.

As such, a binary flag checkEob can be used to instruct the encoder and the decoder to skip encoding and decoding the first bit leading from the root node in the coefficient token tree 700. In effect, when the binary flag checkEob is 0 (i.e., indicating that the root node should not be checked), the root node 701 of the coefficient token tree 700 is skipped and the node 703 becomes the first node of coefficient token tree 700 to be visited for traversal. That is, when the root node 701 is skipped, the encoder can skip encoding and the decoder can skip decoding and can infer a first bit (i.e., a binary bit "1") of the encoded string.

At the start of encoding or decoding a block, the binary flag checkEob can be initialized to 1 (i.e., indicating that the root node should be checked). The following steps illustrate an example process for decoding quantized transform coefficients in an N×N block.

At step 1, the binary flag checkEob is set to zero (i.e., checkEob=0) and an index i is also set to zero (i.e., i=0).

At step 2, a token t[i] is decoded by using either 1) the full coefficient token tree (i.e., starting at the root node 701 of the coefficient token tree 700) if the binary flag checkEob is equal to 1 or 2) using the partial tree (e.g., starting at the node 703) where the EOB_TOKEN is skipped, if checkEob is equal to 0.

At step 3, If the token t[i]=EOB_TOKEN, then the quantized transform coefficients u[i], . . . , u[N*N−1] are all to zero and the decoding process terminates; otherwise, extra bits can be decoded if necessary (i.e., when t[i] is not equal to the ZERO_TOKEN) and reconstruct u[i].

At step 4, the binary flag checkEob is set to 1 if u[i] is equal to zero, otherwise checkEob is set to 0. That is, checkEob can be set to the value (u[i]!=0).

At step 5, the index i is incremented (i.e., i=i+1).

At step 6, the steps 2-5 are repeated until all quantized transform coefficients have been decoded (i.e., until the index i=N*N) or until the EOB_TOKEN is decoded.

Figure 8:
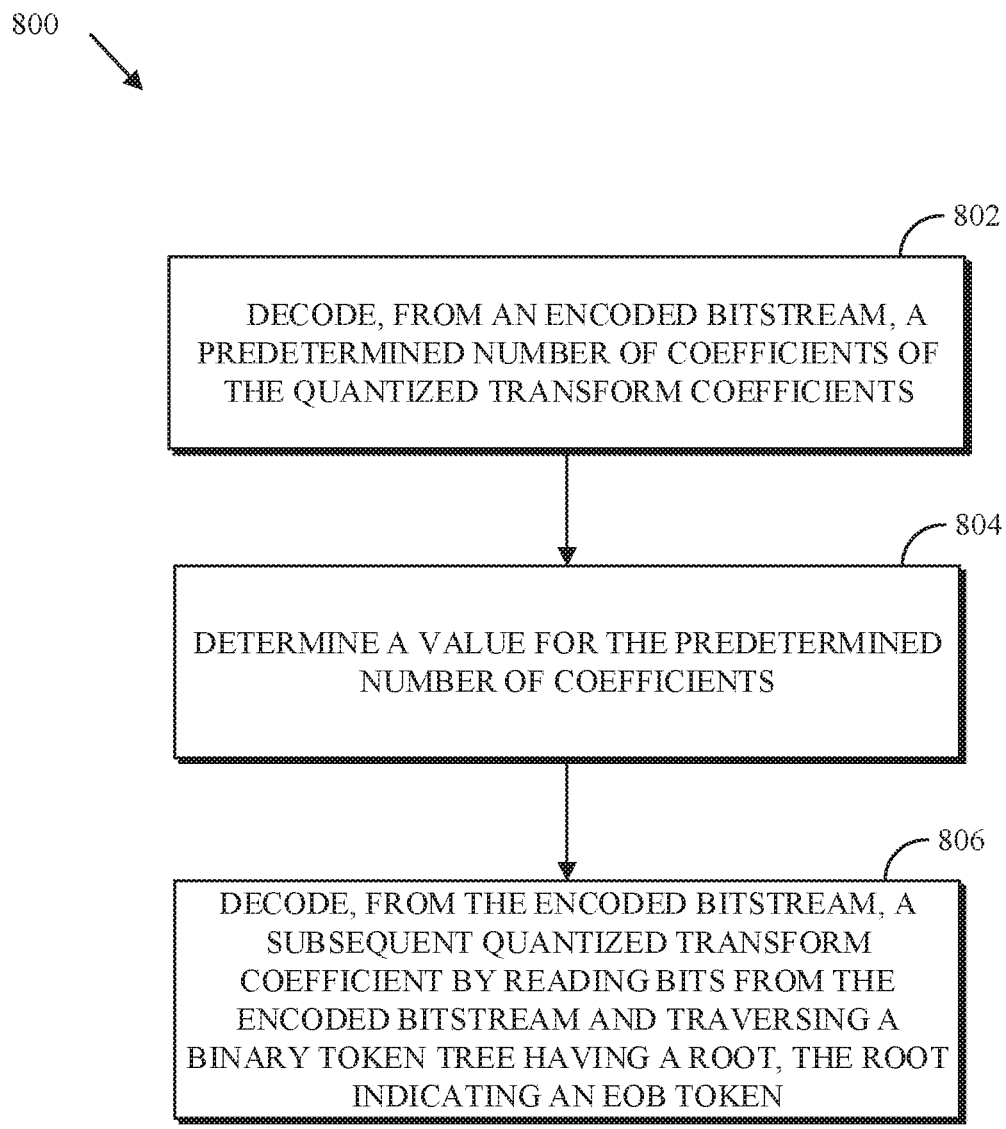
FIG. 8 is a flowchart diagram of a process for decoding a transform block of quantized transform coefficients according to an implementation of this disclosure.

FIG. 8 is a flowchart diagram of a process 800 for decoding a transform block of quantized transform coefficients according to an implementation of this disclosure.

The process 800 may be performed by a decoder such as the decoder 500. The process 800 can be implemented, for example, as a software program that can be executed by computing devices such as the receiving station 106. The process 800 can be performed in whole or in part by the entropy decoding stage 502 of the decoder 500. Implementations of the process 800 can be performed by storing instructions in a memory such as the memory 204 of the receiving station 106 to be executed by a processor such as CPU 202, for example. The process 800 can be implemented using specialized hardware or firmware. Some computing devices can have multiple memories, multiple processors, or both. The steps or operations of the process 800 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

The process 800 uses information embedded in a first group of quantized transform coefficients (i.e., a first coefficients group) to decode other quantized transform coefficients. The quantized transform coefficients can be decoded from an encoded bitstream, such as the compressed bitstream 420 of FIG. 5. The other quantized transform coefficients can be referred to as a second coefficients group. A transform coefficient of the second coefficients group can be referred to a subsequent quantized transform coefficient because it follows, in the scan order, the coefficients of the first coefficients group. The embedded information is information about EOB positions in the second coefficients group. Using the embedded information, decoding a codeword (i.e., a token) for a subsequent transform coefficient may skip decoding an EOB position. If checking the EOB position for a transform coefficient is skipped, then the first bit of the codeword representing the transform coefficient can be assumed (i.e., inferred) to be a "1" bit.

At 802, the process 800 decodes, from an encoded bitstream, a predetermined number of coefficients of the quantized transform coefficients. The predetermined number of coefficients can be a partitioning value as described below with respect to FIG. 10. The predetermined number of coefficients can be communicated from an encoder to a decoder in the encoded bitstream. The predetermined number of coefficients (and, thus, the partitioning value) can be a standard value known to the encoder and the decoder. The predetermined number of coefficients can depend on the transform block size. The predetermined number of coefficients can be based on the total number of non-zero coefficients in the transform block.

At 804, the process 800 determines a value for the predetermined number of coefficients. In an example, the value can be a parity of the predetermined number of coefficients. The parity indicates whether the sum of the predetermined number of coefficients is even or odd. In an example, the sum can be the absolute sum (i.e., the sum of the absolute values of the predetermined number of coefficients). As described below, any number of criteria can be used, alone or in combination, along with the value to determine whether information regarding the EOB positions are embedded in the predetermined number of coefficients and/or whether to use such information.

At 806, the process 800 decodes, from the encoded bitstream, a subsequent quantized transform coefficient. The process 800 can decode the subsequent quantized transform coefficient by reading bits from the encoded bitstream and traversing a coefficient token tree as described above with respect to the coefficient token tree 700 of FIG. 7. When decoding a codeword for the subsequent quantized transform coefficient, each bit read for the codeword results in traversing one branch or another from a node. For example, a codeword of 11100, results in the TWO_TOKEN (i.e., token 708). The decoding the subsequent quantized transform coefficient can use the value to determine whether to traverse the coefficient token tree starting at the root or starting at another node in the coefficient token tree. For the example, if the criterion indicates that the traversal of the coefficient token tree is not to start at the root node, then the process 800 can start the traversal at another node, such as the node 703 of FIG. 7. As such, a first bit of "1" can be implied for the codeword, and a codeword of 11100 read from the encoded bit stream can be implied to be the codeword 111100. As such, the codeword 11100 in the encoded bitstream corresponds to the DCT_CAL_CAT1 token (i.e., the token 714).

In an example, the process 800 can include, on condition that the subsequent quantized transform coefficient (e.g., a coefficient u[i]) is a non-zero coefficient, decoding a coefficient immediately following the subsequent quantized transform coefficient (i.e., a coefficient u[i+1]), such that the decoding uses a position of the subsequent quantized transform coefficient (e.g., as described with respect to 934 of FIG. 9 below) and the parity of the predetermined number of coefficients to determine whether to traverse the coefficient token tree starting at the root node or starting at another node in the coefficient token tree. The position of the subsequent quantized transform coefficient can be the position of the subsequent quantized transform coefficient in the list of non-zero coefficients following the predetermined number of coefficients.

In an example, the process 800 does not use embedded information about the EOB position unless an additional criterion (e.g., one or more criteria) for the predetermined number of coefficients are met. For example, if the sum does not exceed a value threshold, then the process 800 does not imply a first bit (i.e., a 1 bit) for the codewords of any of the transform coefficients subsequent to the predetermined number of coefficients. As such, to determine whether to traverse the coefficient token tree starting at the root node or starting at another node in the coefficient token tree, the decoding the subsequent quantized transform coefficient further uses whether the sum of the predetermined number of coefficients exceeds a value threshold. In an example, the value threshold can be encoded, by an encoder, and communicated to the decoder in an appropriate header (e.g., block, segment, frame, or any other header). In another example, the value threshold can be a standard value known to the encoder and decoder.

In an example, the process 800 does not use embedded information about the EOB position unless a distance between a first non-zero coefficient of the predetermined number of coefficients and a last non-zero coefficient of the predetermined number of coefficients exceeds a distance threshold. For example, and referring to FIG. 6, if the number of the predetermined number of coefficients is 9 and the distance threshold is set to 8, then the process 800 would not use embedded information and will decode the transform coefficients u[9] . . . u[15] using the full coefficient token tree (i.e., the process 800 does not imply a 1 bit for any of the transform coefficients u[9] . . . u[15]). The process 800 would not imply the 1 bit because the first non-zero coefficient is at position 0 (i.e., u[0]=−6) and the last non-zero coefficient in the first 9 coefficients is at position 6 (i.e., u[6]=1). The distance between these 2 position (i.e., 6−0=0) does not exceed the threshold distance 8. In an example, the distance threshold can be encoded, by an encoder, and communicated to the decoder in an appropriate header (e.g., block, segment, frame, or any other header). In another example, the distance threshold can be a standard value known to the encoder and the decoder. As such, to determine whether to traverse the coefficient token tree starting at the root node or starting at another node in the coefficient token tree, the decoding the subsequent quantized transform coefficient further uses whether a distance between a first non-zero coefficient of the predetermined number of coefficients and a last non-zero coefficient of the predetermined number of coefficients exceeds a distance threshold.

In an example, the process 800 does not include the DC coefficient in the predetermined number of coefficients. The DC coefficient can be the first transform coefficient decoded (or available) in the encoded bitstream and corresponds to the transform coefficient at position (0, 0) of the transform block or, equivalently, at location 0 in the 1D array u described above. As such, the process 800 does use the DC coefficient for determining the embedding of the EOB positions.

Figure 9:
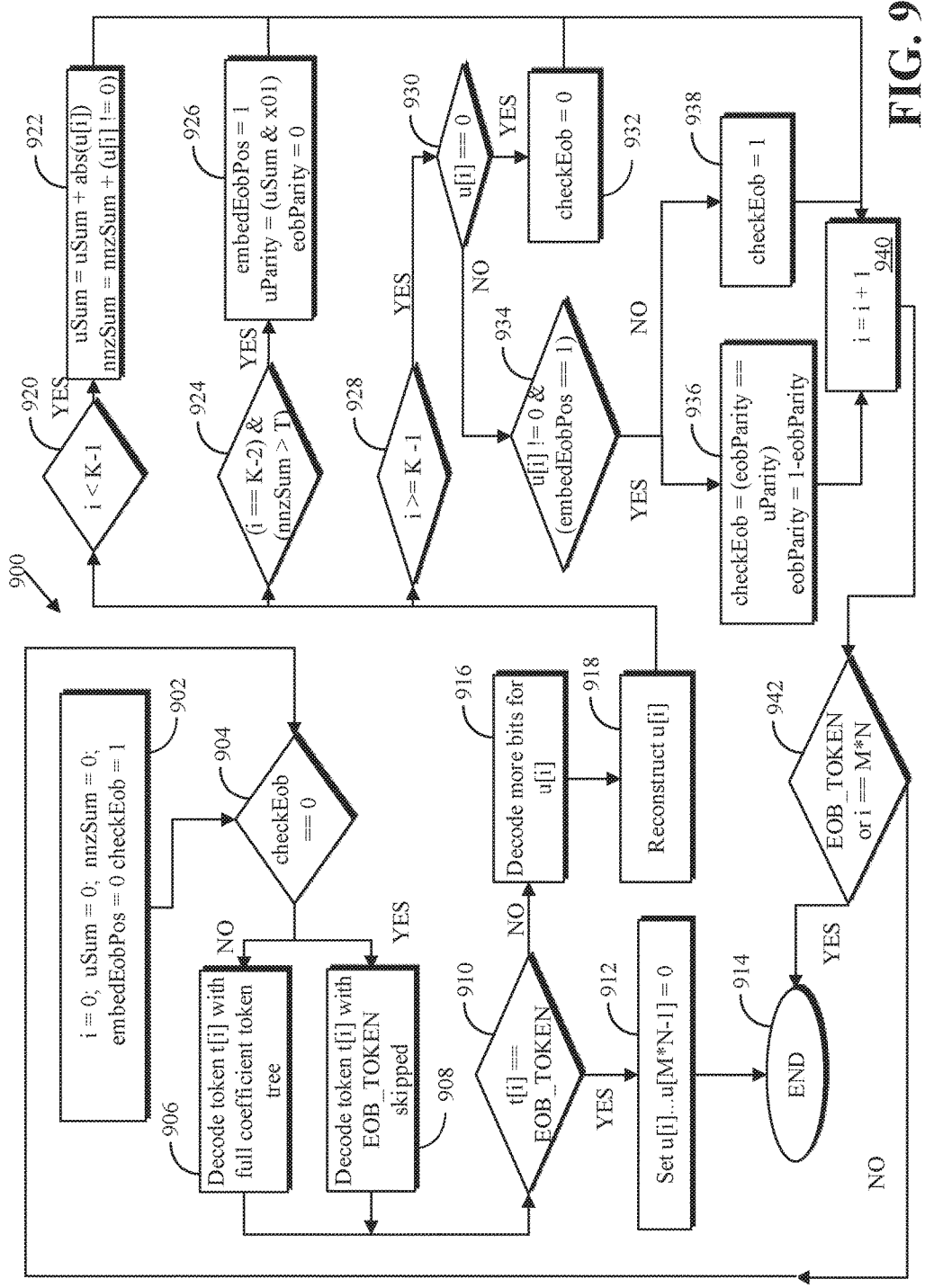
FIG. 9 is a flowchart diagram of a process for decoding a transform block of quantized transform coefficients according to implementations of this disclosure.

FIG. 9 is a flowchart diagram of a process 900 for decoding a transform block of quantized transform coefficients according to implementations of this disclosure. The process 900 can be implemented in a decoder such as the decoder 500. The process 900 can be implemented by a receiving station. The process 900 can be implemented, for example, as a software program that can be executed by computing devices. The software program can include machine-readable instructions that can be stored in a memory such as the memory 204 or the secondary storage 214, and that can be executed by a processor, such as CPU 202, to cause the computing device to perform the process 900. The process 900 can be implemented using specialized hardware or firmware. Some computing devices can have multiple memories, multiple processors, or both. The steps or operations of the process 900 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

To decode an M×N block of quantized coefficients u[0], . . . , u[M*N−1] following a prescribed scan order (e.g., a forward zig-zag scan order, such as the scan order 602 of FIG. 6), the process 900 can execute the following exemplary steps. In the following steps, and as described with respect to FIG. 8, K−1 can be the predetermined number of coefficients of the quantized transform coefficients; uSum can be the sum of the predetermined number of coefficients; T can be number threshold indicating a minimum required number of non-zero coefficients in the predetermined number of coefficients; nnzSum can be the number of non-zero coefficients in the predetermined number of coefficients. T (and any other additional criteria described herein) can be used as a mechanism to enable or disable the embedding of EOB positions described herein. For example, when the number of transform coefficients is sparse (i.e., less than the number threshold T), embedding can be disabled (i.e., bypassed) by both a decoder and an encoder.

EmbedEobPos can be a flag that indicates whether the process 900 can imply a 1 bit for some of subsequent transform coefficients to be decoded. The checkEob flag is set while processing a coefficient u[i] and is used while decoding a coefficient u[i+1] (i.e., the next coefficient). The process 900 uses the checkEob flag to determine whether it can infer (not necessarily that it will) a 1 bit while decoding u[i+1].

The flag eobParity may indicate, if the transform coefficient is a non-zero coefficient, whether its position in the non-zero list of coefficients is even or odd. For example, in the list of coefficients 6, 0, 1, 2, 0, 0, 5, and 7, the non-zero coefficients 6, 2, and 7 would have the same eobParity (e.g., odd) and the non-zero coefficients 1 and 5 would have the opposite eobParity (e.g., even). In another example, eobParity may indicate, for a non-zero transform coefficient, whether its position in the non-zero list of coefficients, excluding the predetermined number of coefficients, is even or odd. In yet another example, eobParity may indicate, for the non-zero transform coefficient, whether its scan position (i.e., the position in the list of all coefficients) is even or odd. As such, At 902, the process 900 initialize a counter i=0 and sets uSum=0, nnzSum=0, embedEobPos=0, and checkEob=1. As described above, checkEob indicates whether the next token to be decoded can be an EOB_TOKEN (i.e., when checkEob=1) or not (when checkEob=0).

At 904, if checkEob is equal to 0 (i.e., if checkEob is not set), the process 900 decodes, at 908, the token t[i] with the EOB_TOKEN skipped. For example, the decoding can start at the node 703 of the coefficient token tree 700 of FIG. 7. If checkEob is equal to 1 (i.e., if checkEob is set), the process 900 decodes, at 906, the token t[i] with the full coefficient token tree. For example, the decoding can start at the root node 701 of the coefficient token tree 700 of FIG. 7.

At 910, if the decoded token t[i] is the EOB_TOKEN, at 912, the process 900 sets the quantized transform coefficients u[i], . . . , u[M*N−1] all to 0 and terminates the decoding process, at 914. Otherwise, the process 900 proceeds to 916. At 916, the process 900 decodes extra bits if necessary based on the value of tok[i]. For example, if tok[i]!=ZERO_TOKEN (i.e., corresponding to the token 704 of FIG. 7), then the process 900 read additional bits until a token is read from the bitstream. At 918, the process 900 reconstructs the quantized transform coefficient u[i].

As long as the counter i is less than K−1, then the process 900 is still decoding the coefficients of the predetermined number of coefficients. As such, at 920, if i<K−1, then at 922, the process 900 accumulates the sum (note that the absolute sum is used in FIG. 9) of the coefficients in uSum (i.e., uSum=uSum+abs(u[i])) and, if u[i] is a non-zero coefficient, then nnzSum is also incremented. The process can then proceed to 940 where the counter i is incremented. At 942, if the EOB_TOKEN has been decoded or if i is equal to M*N (i.e., all the transform coefficients have been decoded), then the process terminates at 914; otherwise, the process returns to 904 and the process is repeated for the next coefficient.

At 924, if i=K−2 (i.e., the process 900 is now processing the first transform coefficient following the predetermined number of coefficients. Additionally, if the additional criterion of the number of the predetermined number of coefficients is satisfied, then the process 900 will use embedded information in the predetermined number of coefficients in the decoding of the remaining transform coefficients of the transform block. In the process 900, the additional criterion used is that the number of non-zero coefficients in the predetermined number of coefficients exceeds the distance threshold T (i.e., nnzSum>T). As described above, additional or other criteria can be used. If embedded information is to be used, then at 926, the process 900 indicates so by setting the flag embedEobPos=1. The process 900 also sets the uParity variable, which is used to determine for which transform coefficient a 1 bit can be inferred. The uParity can be calculated by bit-anding the sum uSum with the binary 1 bit (e.g., uParity=uSum & 0×1). The process 900 also initializes the eobParity=0. The process then proceeds to 940.

At 928, the process 900 tests whether i>=K−1. If so, then the process 900 is currently decoding the remaining (i.e., subsequent) transform coefficients.

At 930, the process 900 tests whether the decoded transform coefficient u[i] is a zero quantized transform coefficient. If so, then the process 900, at 932, sets checkEob to 0 and proceeds to 940. That is, since the coefficient u[i] just decoded is a zero coefficient, and since we know that there are still non-zero coefficients to be decoded (otherwise, the process 900 would have proceeded from 910 to 912 and terminated at 914), then in decoding the next transform coefficient, the process can skip the EOB_TOKEN check (i.e., the root node 701). If u[i] is not zero, the process 900 proceeds to 934.

At 934, if the decoded transform coefficient u[i] is not zero (i.e., u[i]!=0) and the process 900 is using the embedded information (i.e., embedEofPos==1), then the process 900 sets (at 936) checkEob to (eobParity==uParity). For the next coefficient to be decoded, if the eobParity of the current non-zero coefficient is the same as the uParity (i.e., the parity of the predetermined number of coefficients), then decoding the next transform coefficient starts at the EOB_TOKEN (e.g., the root node 701) since the next coefficient can be a zero coefficient. If eobParity is not equal to uParity, then the EOB check can be skipped when decoding the next transform coefficient. At 936, the process 900 also sets the eobParity of the next non-zero coefficient to be the opposite of the eobParity of the current coefficient (i.e., eobParity=1−eobParity).

At 934, if the decoded transform coefficient u[i] is zero or the process 900 is no using the embedded information (i.e., embedEofPos!=1), then the process 900 sets (at 938)

checkEob=1. That is, the process 900 decodes the next transform coefficient starting at the root node 701. That is, the process 900 does not infer a 1 bit for the first bit of the codeword representing the next transform coefficient to be decoded. From 938 and 936, the process 900 proceeds to 940.

K and the number threshold T can be any values. For examples, K can be 16 and T can be 7. In another example, K can be 6 and T can be 2.

Figure 10:
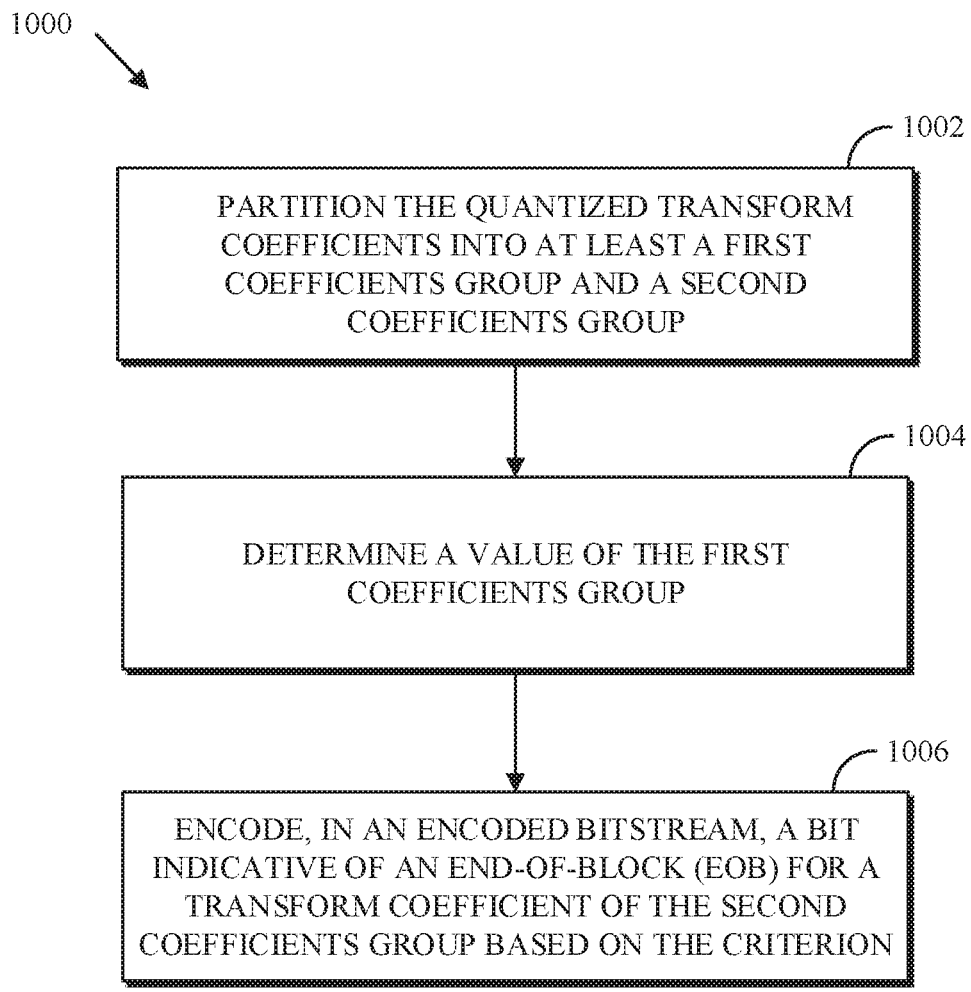
FIG. 10 is a flowchart diagram of a process for encoding a transform block of quantized transform coefficients according to an implementation of this disclosure.

FIG. 10 is a flowchart diagram of a process 1000 for encoding a transform block of quantized transform coefficients according to an implementation of this disclosure. The process 1000 embeds into the transform coefficients of a first coefficients group information regarding the EOB positions of the transform coefficients of a second coefficients group. A decoder can use the embedded information, such as described with respect to FIGS. 8-9, to infer the EOB positions of the transform coefficients of a second coefficients group. The process 1000 partitions a transform block into at least 2 groups: a first coefficients group and a second coefficients group. Using a value of the first coefficients group, the process 1000 can skip encoding a binary decision for some of the transform coefficients of the second coefficients group. The binary decision that is skipped can correspond to skipping the encoding of the "1" bit corresponding to the traversal from the root node 701 to the node 703 of FIG. 7.

The process 1000 can be implemented in an encoder such as the encoder 400 of FIG. 4. The process 1000 can be implemented, for example, as a software program that can be executed by computing devices such as transmitting station 102. The software program can include machine-readable instructions that can be stored in a memory such as the memory 204 or the secondary storage 214, and that can be executed by a processor, such as CPU 202, to cause the computing device to perform the process 1000. In at least some implementations, the process 1000 can be performed in whole or in part by the entropy encoding stage 408 of the encoder 400 of FIG. 4.

At 1002, the process 1000 partitions the quantized transform coefficients into at least a first coefficients group and a second coefficients group.

Figure 11A:
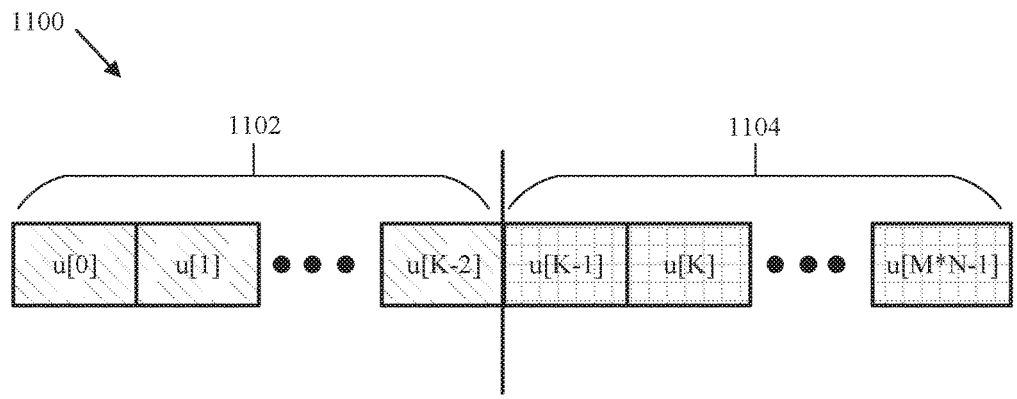
FIG. 11A is an example of partitioning the quantized transform coefficients into at least a first coefficients group and a second coefficients group according to implementations of this disclosure.

FIG. 11A is an example 900 of partitioning the quantized transform coefficients into at least a first coefficients group and a second coefficients group according to implementations of this disclosure. The partitioning can use a partitioning value K. Taking an M×N transform block as an example, and given a prescribed scan order (such as the scan order 602 of FIG. 6), the transform coefficients in an M×N block can be arranged into an array of length M×N (as described with respect to the 1D array u above). Let u[i] denote the coefficient at scan position i, where i=0, . . . , M×N−1. The example 1100 illustrates that the array u[0], . . . , u[M*N−1] is partitioned into two consecutive segments (e.g., a first coefficients group 1102 and a second coefficients group 1104). The first coefficients group 1102 (i.e., the first segment) consists of the coefficients u[0], . . . , u[K−2], and the second coefficients group 1104 (i.e., the second segment) consists of the transform coefficients u[K−1], . . . , u[M*N−1].

At 1004, the process 1000 determines a value of the first coefficients group. In an example, the value can be a parity of the first coefficients group. The parity indicates whether a sum of the coefficients of the first coefficients group is even or odd. In an example, the sum can be the absolute sum of the coefficients of the first coefficients group. That is, the sum can be the sum of the absolute values of the coefficients of the first coefficients group.

At 1006, the process 1000 encodes in an encoded bitstream (such as the compressed bitstream 420 of FIG. 4) a bit indicative of an end-of-block (EOB) for a transform coefficient of the second coefficients group. In an example, in encoding the transform coefficient of the second coefficients group, the process 1000 can use the value to determine whether to encode the transform coefficient by traversing a coefficient token tree (such as the coefficient token tree 700 of FIG. 7) starting at one node (e.g., the root node 701) or starting at another node (e.g., the node 703).

In some implementations, the process 1000 can include conforming the parity of the first coefficients group and a number of the non-zero coefficients of the second coefficients group. Conforming, by an encoder, the parity and the number the non-zero coefficients, enables a decoder to infer information regarding the EOB positions for some transform coefficients by leveraging rules such as:

if the sum of the transform coefficients in a first coefficients group is odd, then the number of nonzero coefficients in a second segment can be assumed to be odd; and if the sum is even, then the number of nonzero coefficients in the second coefficients group can be assumed to be even.

In an example, conforming the parity of the first coefficients group and the number of the non-zero coefficients of the second coefficients group can include, on condition that the parity is even and a number of non-zero coefficients is odd or on condition that the parity is odd and the number of non-zero coefficients is even, adjusting at least one of the quantized transform coefficients of the first coefficients group so that the parity and the number of the non-zero coefficients match.

Adjusting at least one of the quantized coefficients can include adding a total odd value (e.g., 1, 3, 5, etc) to the transform coefficients of the first coefficients group. For example, assuming that the first coefficients group contains the coefficients u[0], . . . , u[K−2], then u[j], where j<K−2, can be set to u[j]=u[j]+1. As another example, u[j] and u[m], where j and m are less than K−2 can be set to u[j]=u[j]+1 and u[m]=u[m]+2. In this case, the total odd value added to the transform coefficients of the first coefficients group is 2+1=3 (i.e., an odd value). In an example, an odd value can be added to only one of the transform coefficients. The one transform coefficient can be the last transform coefficient of the first coefficients group (i.e., u[K−1]). The one transform coefficient can be randomly selected. The one transform coefficient can be selected based on the rate distortion cost of making the change to the one coefficient.

In an example, conforming the parity of the first coefficients group and the number of the non-zero coefficients of the second coefficients group can include, on condition that the parity is even and a number of non-zero coefficients is odd or on condition that the parity is odd and the number of non-zero coefficients is even, setting at least one of the non-zero coefficients of the second coefficients group to zero so that the parity and the number of the non-zero coefficients match. In an example, setting at least one of the non-zero coefficients of the second coefficients group to zero can include setting an odd number of non-zero coefficients of the second coefficients group to zero. Which transform coefficient(s) of the second coefficient is (are) set to zero can be selected based on the rate distortion cost of making the change.

In an example of the process 1000, encoding the bit indicative of the EOB for the transform coefficient of the second coefficients group based on the value can include, on condition that a position of the transform coefficient in the second coefficients group matching the parity, encoding, in the encoded bitstream, the transform coefficient including the bit indicative of the EOB, and on condition that the position of the transform coefficient in the second coefficients group not matching the parity, encoding, in the encoded bitstream, the transform coefficient excluding the bit indicative of the EOB.

Figure 11B:
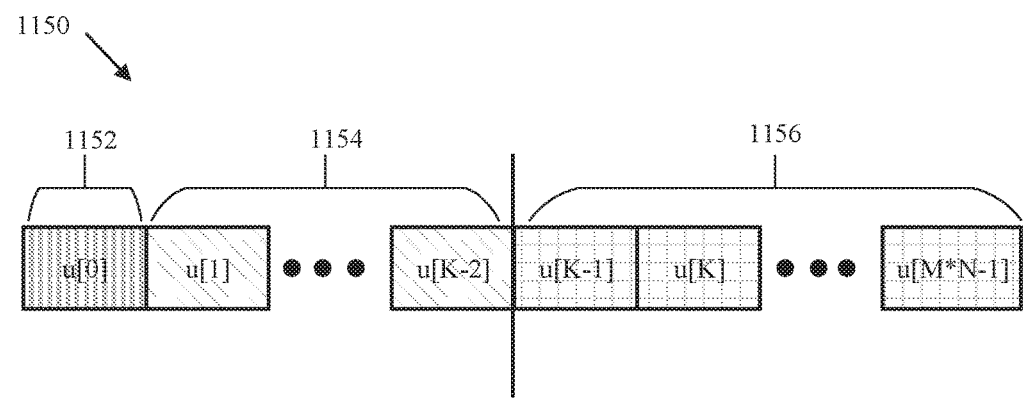
FIG. 11B is an example of partitioning the quantized transform coefficients into three consecutive groups according to implementations of this disclosure.

In an example of the process 1000, the DC coefficient of the quantized transform coefficients is not included in the first coefficients group and the DC coefficient is not included in the second coefficients group. For example, the quantized transform coefficients can be partitioned into at least three groups such that one of the groups includes the DC coefficient. In such as case, the first coefficients group can be first consecutive group after the group containing the DC coefficient. FIG. 11B illustrates an example.

FIG. 11B is an example 950 of partitioning the quantized transform coefficients into three consecutive groups according to implementations of this disclosure. Example 950 includes three consecutive groups, namely a group 1152, a group 1154, and a group 1156. As indicated above, u[0] is the DC coefficient. As such, the first group (i.e., the group 1152) includes the DC coefficient. Although the first group is shown as including only one coefficient, it can include more coefficients. In the case of the example 950, the group 1154 and the group 1156 can be, respectively, the first coefficients group and the second coefficients group as described with respect to FIG. 10. Excluding the DC coefficient from the first group may avoid negative impacts on the visual quality of reconstructed images due to the potential changing of DC values (for example, as described below with respect to 1210 of FIG. 12).

Figure 12:
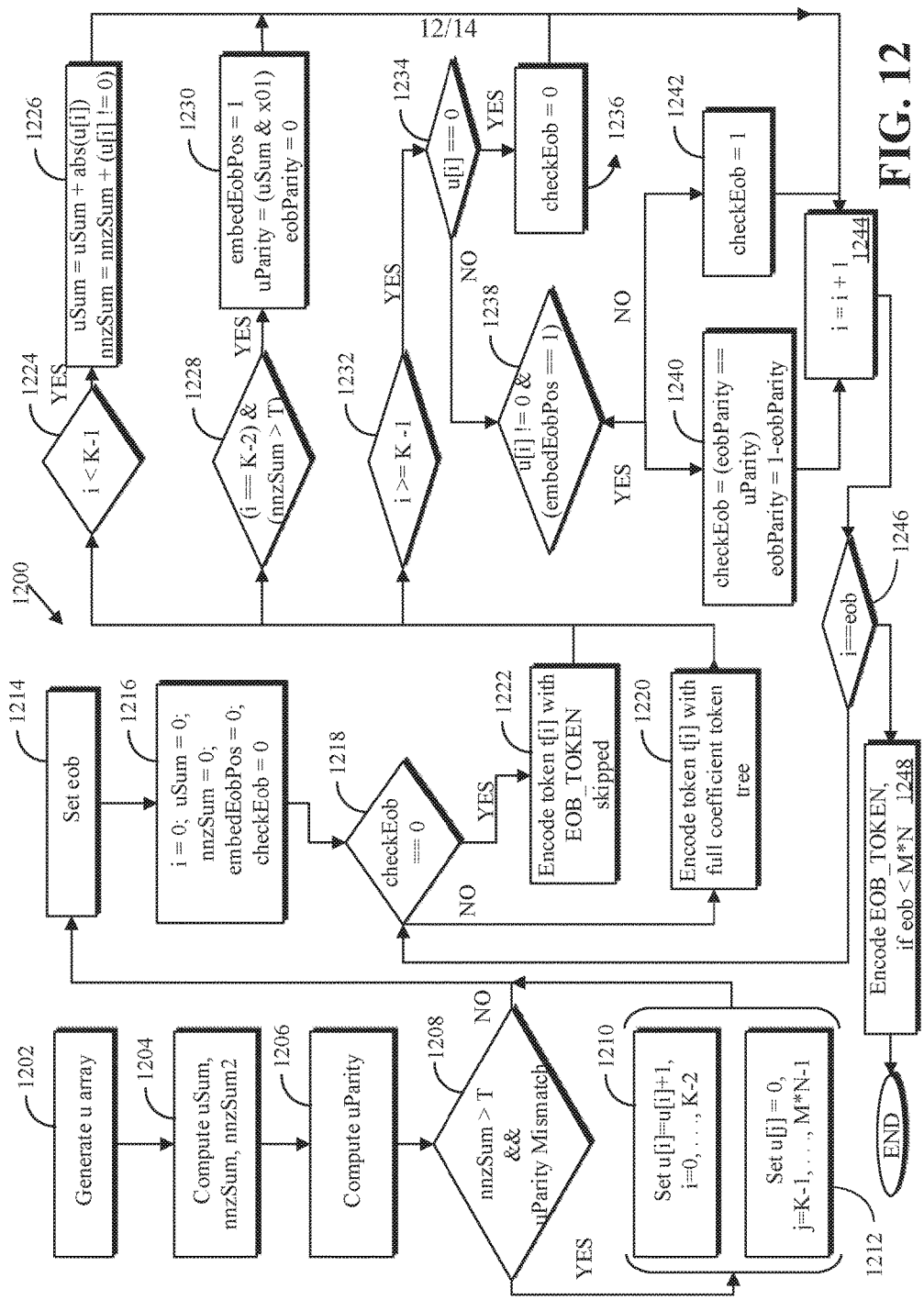
FIG. 12 is a flowchart diagram of a process for encoding a transform block of quantized transform coefficients according to implementations of this disclosure.

FIG. 12 is a flowchart diagram of a process for encoding a transform block of quantized transform coefficients according to implementations of this disclosure. The process 1200 can be implemented in by encoder such as in the entropy encoding stage 408 of the encoder 400 of FIG. 4. The process 1200 can be implemented, for example, as a software program that can be executed by computing devices. The software program can include machine-readable instructions that can be stored in a memory such as the memory 204 or the secondary storage 214, and that can be executed by a processor, such as CPU 202, to cause the computing device to perform the process 1200. The process 1200 can be implemented using specialized hardware or firmware. Some computing devices can have multiple memories, multiple processors, or both. The steps or operations of the process 1200 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

The process 1200 partitions the quantized transform coefficients into two groups. The partitioning can be accomplished by selecting a partitioning value K. The first coefficients group includes the coefficients u[0], ... , [K−2] and the second coefficients group includes the coefficients u[K−1], ... , u[M*N−1]. The process 1200 determines whether to encode an EOB position decision for at least some of the transform coefficients of the second coefficients group based on criteria of the coefficients of the first coefficients group.

In the steps below, K−1, uSum, nnzSum, uParity, T, checkEob, embedEobPos, and eobParity can be as described with respect to FIG. 9. nnzSum2 is the number of non-zero coefficients in the second coefficients group.

Given an M×N transform block, the process 1200, at 1202, generates, according to a prescribed scan order a 1D array u of quantized transform coefficients u[0], ... , u[M*N−1] as described above with respect to FIG. 6.

At 1204, the process 1200 computes the sum uSum (e.g., $$uSum = \sum_{i=0}^{K-2} \text{abs}(u[i])$$

of the coefficients of the first coefficients group, computes the number of non-zero coefficients in the first coefficients group nnzSum (e.g., $$nnzSum = \sum_{i=0}^{K-2} (u[i] != 0)$$

and computes the number of non-zero coefficients in the second coefficients group nnzSum2 (e.g., $$nnzSum2 = \sum_{i=K-1}^{K-2M*N-1} (u[i] != 0)$$

At 1206, the process 1200 computes the parity uParity of the first coefficients group. For example, the uParity can be calculated by bit-anding the sum uSum with the binary 1 bit (e.g., uParity=uSum & 0x1).

At 1208, the process 1200 determines whether the number of non-zero coefficients nnzSum is greater than the number threshold T (i.e., nnzSum>T) and whether there is a parity mismatch. If so, the process 1200 performs at least one of 1210 or 1212 (to conform the parity of the first coefficients group and a number of the non-zero coefficients of the second coefficients group as described with respect to FIG. 10) and then proceeds to 1214; otherwise the process 1200 proceeds to 1214. The process 1200 executes at least one of 1210 and 1212 in order to conform the parity of the first coefficients group and the number of the non-zero coefficients of the second coefficients group.

If the number of non-zero coefficients nnzSum does not exceed the number threshold T, then the process 1200 does not use information embedded in the first coefficients group in the encoding of at least some of the coefficients of the second coefficients group. That is, the process 1200 does not use a value of the first coefficient group to skip the encoding of a decision related to the EOB position (e.g., not traversing the root node of the coefficient token tree 700) for a coefficient of the second coefficient group. At 1210, the process 1200 can increment one of coefficients of the first group by 1 (e.g., u[i]=u[i]+1, for an i=0, ... , K−2). At 1212, the process 1200 changes to zero the value of the one of the non-zero transform coefficients of the second coefficients group (e.g., u[j]=0, for a j=K−1, ... , M*N−1 and u[j]!=0).

At 1214, the process 1200 finds the last nonzero coefficient u[i*] in u[0], ... , u[M*N−1] and set eob=i*+1. The steps 1216, 1218, 1224, 1226, 1228, 1230, 1232, 1234, 1238, 1236, 1240, 1242, and 1244 can be, respectively, as described with respect to the steps 902, 904, 920, 922, 924, 926, 928, 930, 934, 932, 936, 938, and 940 of FIG. 9.

At step 1220, the process 1200 encodes the token t[i] using the full coefficient token tree. That is, the process 1200, to encode the token t[i] can traverse the coefficient token tree 700 of FIG. 7 starting at the root node 701. For example, to encode the "4" token (i.e. FOUR_TOKEN), the process 1200, at step 1220, encodes the codeword 111011 using binary arithmetic coding. On the other hand, at step 1222, the process 1200 encodes the token t[i] by skipping the EOB_TOKEN. That is, the process 1200 can traverse the coefficient token tree 700 of FIG. 7 by starting the traversal at a node other than the root node 701. The other node can be the node 703. For example, to encode the FOUR_TOKEN, the process 1200, at step 1220, encodes the codeword 11011 using binary arithmetic coding.

At 1246, the process 1200 checks whether all the non-zero coefficients have been processed (i.e., i==eob). If not, the process repeats for the next transform coefficient at 1218. If so, then the process 1200 encodes the EOB_TOKEN (i.e., the token 702 of FIG. 7) if the value of the eob variable is less than M*N (i.e., eob<M*N). That is, the process 1200 encodes the EOB_TOKEN if the last non-zero transform coefficient is not the coefficient in the scan order.

Some video coding systems use a technique that is referred to as multiple sign bit hiding (MSBH). For example, MSBH can embed the sign of the first significant transform coefficient in a group of coefficients in the parity of the sum of absolute values of all coefficients in the group of coefficients. As such, MSBH does not encode a syntax element (i.e., syntax elements corresponding to sign information) based on the parity.

The techniques described herein differ in at least the following respects from sign bit hiding. Whereas MSBH hides a specific syntax element (i.e., the sign of a nonzero coefficient), implementations according to this disclosure embed information related to EOB decisions rather than embedding information related to a syntax element per se. Sign data may be encoded as raw bits (i.e., without using a context and/or without using binary arithmetic coding) whereas coding of the EOB decision is context-based. As such, coding of EOB decisions is more computationally expensive than coding of a sign bit. Thus, whereas MSBN may not change the number of context-coded bins in a transform block, implementations according to this disclosure reduce the number of context-coded bins (and substantially so for a large transform blocks). Additionally, the concepts of MSBH may not be directly applied to hide the EOB decision because the large range of EOB likely render the cost of hiding impractical. Furthermore, the techniques described herein make use of, and are designed to work with, the structure of the token tree used to encode and decode quantized coefficients.

It may be desirable to embed EOB positions in coefficient values as described herein in cases where quantization is applied to the coefficients of a transform block. As such, embedding of the EOB positions can be disabled in lossless coding mode.

The uParity carries information about the remaining quantized coefficients, such as whether the number of nonzero coefficients among the remaining quantized coefficients is even or odd. As such, the information (i.e., the parity information) may be used to improve coding of the decision whether a coefficient is zero or non-zero at a position. For example, to code and decode a token given the coefficient token tree 700 of FIG. 7, a context may be derived by using uParity, in addition to information traditionally, such as the position of the coefficient, the transform size and type, the color components (luma or chroma), and/or previously decoded history.

In an implementation, a flag in a picture header (e.g., a flag named enable_embedded_eobpos) may be used to enable or disable the embedding of EOB positions in the picture to which the header is associated. In an implementation, embedding of EOB positions is enabled by default. As such, if the flag is not present in a header, then embedding of EOB positions is enabled by default (except, as already indicated, in lossless coding mode).

As can be appreciated, the techniques described herein can be used to embed different information regarding the end-of-block positions. For example, the techniques described herein can be easily modified to embed, into the coefficients of a first coefficients group, whether the EOB coefficient is at an even or an odd location within a second coefficients group.

Table II below illustrates incorporating, into a standard codec, an implementation of embedding EOB positions in coefficient values according to this disclosure. A "*" in the column EmbedEOB of Table II indicates that the corresponding code fragment to the left of the "*" is related to the embedding EOB positions in coefficient values.

TABLE II

| | |
|---|---|
| tokens( plane, startX, startY, txSz, blockIdx ) { | EmbedEOB |
| segEob = 16 << (txSz << 1) | |
| scan = get_scan( plane, txSz, blockIdx ) | |
| checkEob = 1 | |
| uSum = 0 | * |
| nnzSum = 0 | * |
| embedEobPos = 0 | * |
| for( c = 0; c < segEob; c++ ) { | |
|   pos = scan[ c ] | |
|   ... | |
|   if (token == ZERO_TOKEN ) { | |
|     Tokens[ pos ]= 0 | |
|     checkEob = 0 | |
|   } else { | |
|     coef = read_coef( token ) | |
|     sign_bit | |
|     Tokens[ pos ] = sign_bit ? -coef : coef | |
|     checkEob = 1 | |
|   } | |
|   ... | |
|   if ( !lossless ) { | * |
|     if ( c > 0 && c < EOB_SUM_BOUNDARY ) { | * |
|       uSum = uSum + coef | * |
|       nnzSum = nnzSum + (coef != 0) | * |
|     } | * |
|     if ( c == EOB_SUM_BOUNDARY - 1 ) { | * |
|       if ( nnzSum > EOB_NNZ_LOWERBOUND ) { | * |
|         embedEobPos = 1 | * |
|         uParity = (uSum & 0x1) | * |
|         eobParity = 0 | * |
|       } | * |
|     } | * |
|     if ( c >= EOB_SUM_BOUNDARY && | * |
|     embedEobPos && checkEob) { | |
|       checkEob = (uParity == eobParity) | * |
|       eobParity = 1 - eobParity | * |
|     } | * |
|   } | * |
| } | |
| } | |

The aspects of encoding and decoding described above illustrate some encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a general purpose computer or general purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method for decoding a transform block of quantized transform coefficients, comprising:
    decoding, from an encoded bitstream, a predetermined number of coefficients of the quantized transform coefficients;
    determining a value for the predetermined number of coefficients; and
    decoding, from the encoded bitstream, a subsequent quantized transform coefficient by reading bits from the encoded bitstream and traversing a coefficient token tree having a root node, the root node indicating an EOB token,
        wherein the subsequent quantized transform coefficient follows the predetermined number of coefficients in a scan order, and
        wherein the decoding the subsequent quantized transform coefficient uses the value to determine whether to traverse the coefficient token tree starting at the root node or starting at another node in the coefficient token tree.

2. The method of claim 1, wherein the value comprises a parity of the predetermined number of coefficients, the parity indicating whether a sum of the predetermined number of coefficients is even or odd.

3. The method of claim 2, further comprising:
    on condition that the subsequent quantized transform coefficient is a non-zero coefficient, decoding a coefficient immediately following the subsequent quantized transform coefficient, wherein the decoding uses a position of the subsequent quantized transform coefficient and the parity of the predetermined number of coefficients to determine whether to traverse the coefficient token tree starting at the root node or starting at another node in the coefficient token tree.

4. The method of claim 3, wherein the position of the subsequent quantized transform coefficient is a position in a list of non-zero coefficients following the predetermined number of coefficients.

5. The method of claim 2, wherein, to determine whether to traverse the coefficient token tree starting at the root node or starting at another node in the coefficient token tree, the decoding the subsequent quantized transform coefficient further uses whether the sum of the predetermined number of coefficients exceeds a value threshold.

6. The method of claim 1, wherein, to determine whether to traverse the coefficient token tree starting at the root node or starting at another node in the coefficient token tree, the decoding the subsequent quantized transform coefficient further uses whether a distance between a first non-zero coefficient of the predetermined number of coefficients and a last non-zero coefficient of the predetermined number of coefficients exceeds a distance threshold.

7. The method of claim 1, wherein the predetermined number of coefficients does not include a DC coefficient.

* * * * *